No. 731,588. PATENTED JUNE 23, 1903.
T. P. MEINHARD.
POWER GEAR AND BRAKE APPARATUS FOR AUTOMOBILES.
APPLICATION FILED DEC. 4, 1902.
NO MODEL. 2 SHEETS—SHEET 1.
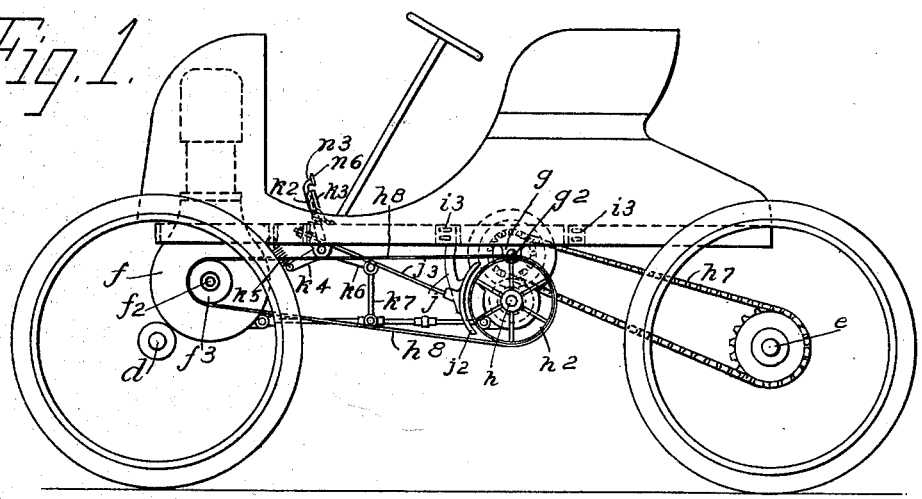
WITNESSES
Alexander Kethel.
F. A. Stewart.
INVENTOR
Theodore P. Meinhard
BY
Edgar Late & Co.
ATTORNEYS

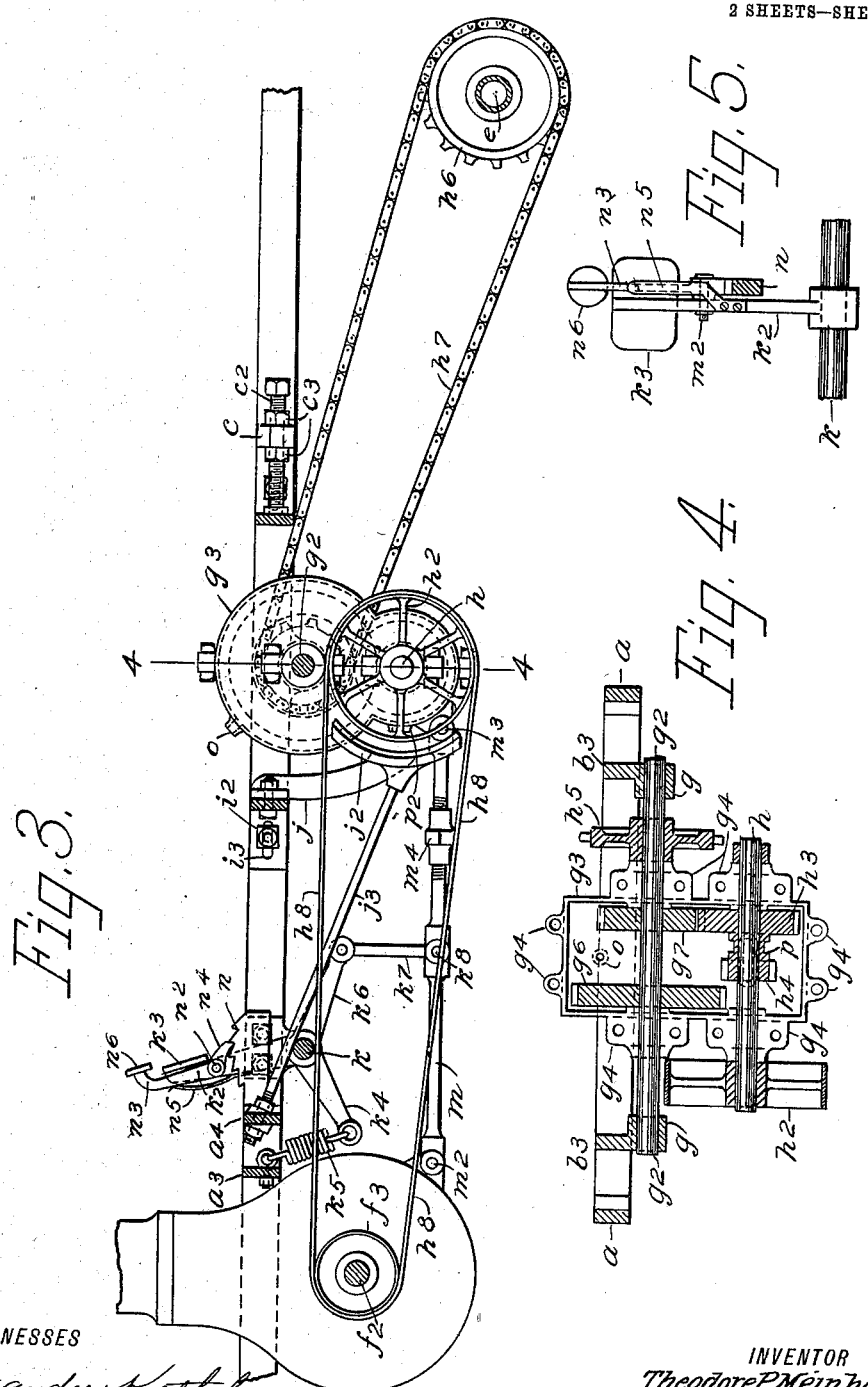

No. 731,588. Patented June 23, 1903.

UNITED STATES PATENT OFFICE.

THEODORE P. MEINHARD, OF BROOKLYN, NEW YORK.

POWER-GEAR AND BRAKE APPARATUS FOR AUTOMOBILES.

SPECIFICATION forming part of Letters Patent No. 731,588, dated June 23, 1903.

Application filed December 4, 1902. Serial No. 133,859. (No model.)

*To all whom it may concern:*

Be it known that I, THEODORE P. MEINHARD, a citizen of the United States, residing at Brooklyn, in the county of Kings and State of New York, have invented certain new and useful Improvements in Power-Gear and Brake Apparatus for Automobiles, of which the following is a specification, such as will enable those skilled in the art to which it appertains to make and use the same.

The object of this invention is to provide an improved power-gear and brake apparatus for road-vehicles operated by power in which the power may be released and a brake applied whenever desired by simply operating a foot lever or levers; and with this and other objects in view the invention consists in a power-gear, power-releasing device, speed-gear, and brake constructed and operated as hereinafter described and claimed.

The invention is fully disclosed in the following specification, of which the accompanying drawings form a part, in which the separate parts of my improvement are designated by suitable reference characters in each of the views, and in which—

Figure 1 is a side view of a road-vehicle provided with my improvement; Fig. 2, a plan view thereof with the bed or body portion removed and showing only the running-gear; Fig. 3, a sectional side view of the running-gear; Fig. 4, a section on the line 4 4 of Fig. 3, and Fig. 5 a front view of the operating pedal-plates.

In the drawings forming part of this specification I have shown a road-vehicle comprising a truck-frame composed of side bars $a$, end bars $a^2$, and two supplemental transverse bars $a^3$ and $a^4$, arranged near the front end of the truck-frame, together with a forwardly and backwardly adjustable supplemental frame $b$, composed of transverse bars $b^2$, connected by parallel bars $b^3$, arranged longitudinally of the truck-frame. The supplemental frame $b$, which forms a part of the main truck-frame, is made adjustable forwardly and backwardly to a slight extent by means of inwardly-directed brackets $c$, secured to the side bars $a$ of the main truck-frame and through which are passed adjusting-screws $c^2$, having set-nuts $c^3$ and the forward ends of which are connected with the frame $b$ at $c^4$ in any desired manner. The main truck-frame is also provided with the usual front axle $d$ and rear axle $e$; but in the drawings forming part of this specification the connection between these axles and the truck-frame is not shown, for the reason that it is not necessary for the purposes of describing this invention; but the relative position of the axles with reference to each other and the truck-frame is clearly shown.

Mounted in the front end of the truck-frame and extending upwardly into the body or bed of the vehicle is a motor $f$, which may be of any preferred construction, and this motor is provided with a power-shaft $f^2$, having a belt-wheel $f^3$.

Mounted transversely in the bars $b^3$ of the supplemental frame $b$ or in downwardly-directed bearings $g$, connected therewith, is a shaft $g^2$, on which is hung a swinging gear-box $g^3$, preferably divided vertically into two separate members, having shoulders or projections $g^4$, by which they are connected by means of bolts or similar devices, and within the gear-box $g^3$ the shaft $g^2$ is provided with a large gear-wheel $g^6$ and a smaller gear-wheel $g^7$, and these wheels are rigidly secured to said shaft.

Passing transversely through the bottom of the gear-box $g^3$ parallel with the shaft $g^2$ is a supplemental shaft $h$, provided at one end with a belt-wheel $h^2$, and mounted on this shaft within the gear-box is a gear-wheel $h^3$, with which is rigidly connected, by means of an integral neck or hub or in any desired manner, a smaller gear-wheel or pinion $h^4$, and the gear-wheel $h$ and the pinion $h^4$ are free to move longitudinally on the shaft $h$, but cannot turn thereon. The shaft $g^2$ is also provided outside of the gear-box $g^3$ with an ordinary sprocket-wheel $h^5$, and the rear axle $e$ of the vehicle is provided with a corresponding sprocket-wheel $h^6$, and these wheels are geared in connection by an ordinary drive-chain $h^7$, and the wheel $h^2$ on the shaft $h$ is geared in connection with the wheel $f^3$ on the shaft $f^2$ of the motor by means of a belt $h^8$.

The ends of the transverse bars $b^2$ of the supplemental frame of the truck are slidably connected with the side bars $a$ of the main truck at $i$, this connection being made by means of bolts $i^2$, which pass through slots $i^3$, formed in the said side bars $a$ of the main truck; but this connection may be made in any desired manner, all that is necessary being that the supplemental truck-frame $b$ be made adjustable forwardly and backwardly.

Suspended from the front transverse bar $b^2$ of the supplemental truck-frame $b$ is an arm $j$, which is secured to the said bar $b^2$ in any desired manner, and this arm $j$ is provided at its lower end with a brake-shoe $j^2$, which is adapted to bear on the wheel $h^2$, and a brace-rod $j^3$ is connected with the brake-shoe $j^2$ and extended forwardly and adjustably connected with the transverse bar $a^4$ of the main truck-frame.

Extending transversely of the main truck-frame and preferably slightly rearwardly of and below the transverse bar $a^4$ is a shaft $k$, with which is connected a pedal-crank $k^2$, provided with a foot-plate $k^3$. The shaft $k$ is also provided with a downwardly and forwardly directed arm $k^4$, which is connected with the transverse bar $a^3$ of the main truck-frame by a spring $k^5$, and said shaft is also provided with another downwardly-directed arm $k^6$, with which is connected a link $k^7$, which is connected at $k^8$ with a toggle-lever rod $m$, one end of which is pivoted to the motor-casing at $m^2$ and the other to the bottom portion of the gear-box at $m^3$ and the rear end of which is composed of two parts adjustably connected by a turnbuckle $m^4$.

Arranged adjacent to the pedal-lever $k^2$ and secured to the transverse bar $a^4$ of the main truck-frame or secured in any desired manner is a ratchet-plate $n$, and connected with the pedal-lever $k^2$ at $n^2$ is a pawl-lever $n^3$, provided with a pawl $n^4$, and a spring $n^5$ is secured to the pedal-lever $k^2$ and bears on the back of the pawl-lever $n^3$, and said pawl-lever is provided with a foot-plate $n^6$, and the pawl $n^4$ operates in connection with the teeth of the ratchet-plate $n$.

As thus constructed it will be seen that with the parts in the position shown in the drawings the vehicle will be driven through the agency of the gear-wheels $g^7$ and $h^3$, and a high speed will be given to said vehicle. If the wheels $h^3$ and $h^4$ be shifted on the shaft $h$ so that the wheel $h^4$ will engage with the wheel $h^6$, a lower speed for the vehicle with higher power will be secured, this gearing being especially adapted for use in climbing hills. If at any time the operator desires to release the gear or power and apply the brake, he simply presses his foot on the plate $h^3$. This operation raises the arm $k^6$ and flexes the toggle-lever bar $m$ at the middle, the joint $k^8$ moving upwardly, and this operation pulls forwardly the lower end of the gear-box $g^3$, which is free to turn on the shaft $g^2$, and throws the wheel $h^2$ into contact with the brake-shoe $j^2$, and the friction produced will depend upon the pressure applied on the plate $h^3$ of the pedal-lever $k^2$. It will also be observed that this movement flexes or releases the belt $h^8$ and the power of the motor is not applied to the gear-box or to the wheel $h^2$.

It will be understood that the pawl-lever $n^3$ and the pawl $n^4$, connected therewith, operate to hold the parts in the above-named position or to hold the wheel $h^2$ in contact with brake-shoe $k^2$, and whenever it is desired to return these parts to their normal position or into the position shown in Figs. 1 and 3 the pawl $n^4$ is released by pressing on the foot-plate $n^6$ of the pawl-lever $n^3$, and the spring $h^5$ operates to return the operative parts of the mechanism to their normal position or that shown in Figs. 1 and 3.

The parts within the gear-box $g^2$ may be lubricated through a nozzle $o$, with which said box is provided, and any suitable means may be provided for shifting the wheels $h^3$ and $h^4$ on the shaft $h$, and in Fig. 4 I have shown in dotted lines at $p$ an opening in the casing or gear-box for the insertion of a lever or other suitable device to accomplish this object, and this opening is provided with a surrounding flange or collar, which is shown at $p^2$ in Fig. 3.

In the form of construction herein shown and described the pedal-lever $k^2$ is placed directly over the downwardly and forwardly directed arm $h^4$ and may be formed integrally therewith, while the downwardly and backwardly directed arm $k^6$ of the shaft $k$ is formed separately; but it will be apparent that these parts may be formed in any desired manner and may also be secured to said shaft $k$ in any desired manner, and other changes in and modifications of the construction herein described may be made without departing from the spirit of my invention or sacrificing its advantages.

Having fully described my invention, what I claim as new, and desire to secure by Letters Patent, is—

1. In a road-vehicle, a motor, a swinging gear-box mounted on a shaft adapted to be geared in connection with one of the axles of the vehicle, a supplemental shaft mounted in said gear-box and adapted to swing therewith, and provided outside of the gear-box with a wheel adapted to be geared in connection with the motor, means within the gear-box for gearing said shafts in connection and giving the supplemental shaft different rates of speed, a brake-shoe supported adjacent to the wheel connected with the supplemental shaft and means for swinging the gear-box so as to bring said wheel into contact with said brake-shoe, substantially as shown and described.

2. In a road-vehicle, a truck-frame provided with the usual axles, a motor mounted in said frame, a shaft mounted transversely of said frame and geared in connection with one of the axles, a swinging gear-box mounted on said shaft, a supplemental shaft mounted in said gear-box and adapted to swing therewith and one end of which projects therefrom and is provided with a belt-wheel, a belt gearing said wheel in connection with the shaft of the motor, a brake-shoe supported in front of said wheel and means for swinging the gear-box so as to bring said wheel into contact with said brake-shoe, substantially as shown and described.

3. In a road-vehicle, a truck-frame provided with the usual axles, a motor mounted in said frame, a shaft mounted transversely of said frame and geared in connection with one of the axles, a swinging gear-box mounted on said shaft, a supplemental shaft mounted in said gear-box and adapted to swing therewith and one end of which projects therefrom and is provided with a belt-wheel, a belt gearing said wheel in connection with the shaft of the motor, a brake-shoe supported in front of said wheel and means for swinging the gear-box so as to bring said wheel into contact with said brake-shoe, said gear-box and said brake-shoe being adjustable forwardly and backwardly of the truck-frame, substantially as shown and described.

4. In a motor-vehicle, a truck-frame, a motor supported therein, a shaft supported transversely of the truck-frame and adapted to be geared in connection with one of the axles, a swinging gear-box mounted on said shaft, a supplemental shaft passing therethrough and adapted to swing therewith, a wheel connected with one end of said shaft and adapted to be geared in connection with the shaft of the motor, a brake-shoe supported in front of said wheel, a toggle-lever connected with said gear-box and adapted to swing the same, and means for operating said toggle-lever, substantially as shown and described.

5. In a motor-vehicle, a truck-frame, a motor supported therein, a shaft supported transversely of the truck-frame and adapted to be geared in connection with one of the axles, a swinging gear-box mounted on said shaft, a supplemental shaft passing therethrough and adapted to swing therewith, a wheel connected with one end of said shaft and adapted to be geared in connection with the shaft of the motor, a brake-shoe supported in front of said wheel, a toggle-lever connected with said gear-box and adapted to swing the same, and means for operating said toggle-lever, consisting of a shaft mounted thereover and provided with an upwardly-directed pedal-lever and a downwardly-directed arm connected with said toggle-lever, and another arm connected with the truck-frame by a spring, substantially as shown and described.

6. In a motor-vehicle, a truck-frame, a motor supported therein, a shaft supported transversely of the truck-frame and adapted to be geared in connection with one of the axles, a swinging gear-box mounted on said shaft, a supplemental shaft passing therethrough and adapted to swing therewith, a wheel connected with one end of said shaft and adapted to be geared in connection with the shaft of the motor, a brake-shoe supported in front of said wheel, a toggle-lever connected with said gear-box and adapted to swing the same, and means for operating said toggle-lever, consisting of a shaft mounted thereover and provided with an upwardly-directed pedal-lever and a downwardly-directed arm connected with said toggle-lever, and another arm connected with the truck-frame by a spring, said pedal-lever being also provided with a pawl-lever having a pawl operating in connection with a ratchet secured to the truck-frame, substantially as shown and described.

In testimony that I claim the foregoing as my invention I have signed my name, in presence of the subscribing witnesses, this 2d day of December, 1902.

THEODORE P. MEINHARD.

Witnesses:
J. C. LARSEN,
F. A. STEWART.